April 21, 1964     H. STULMAN     3,129,820
ADJUSTABLE SMOKEHOUSE TREE
Filed Dec. 16, 1960
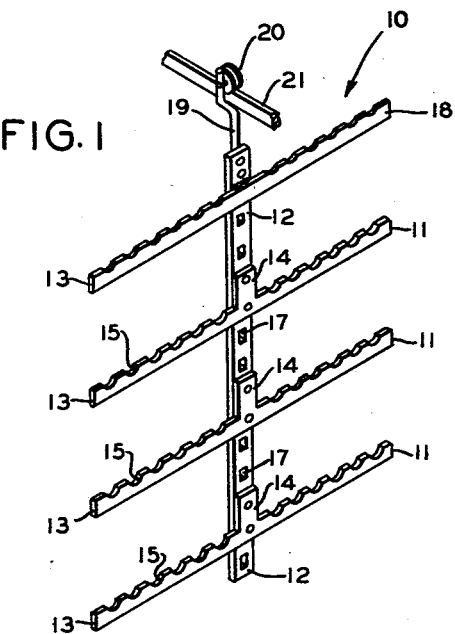
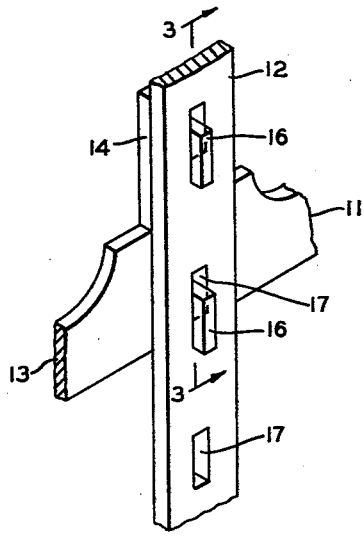
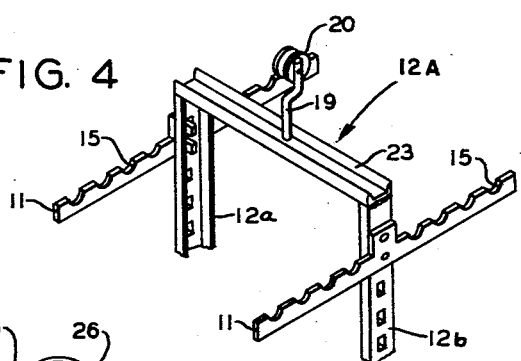
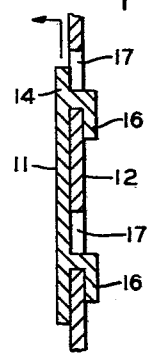
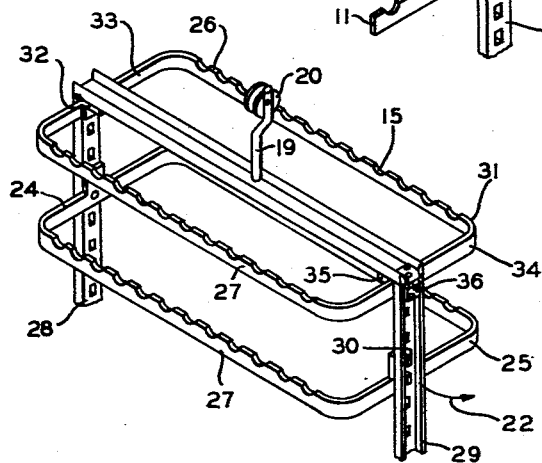
*INVENTOR.*
HOWARD STULMAN United States Patent Office 3,129,820
Patented Apr. 21, 1964

3,129,820
ADJUSTABLE SMOKEHOUSE TREE
Howard Stulman, 7624 Algon Ave., Philadelphia, Pa.
Filed Dec. 16, 1960, Ser. No. 86,836
1 Claim. (Cl. 211—117)

This invention relates to an adjustable smokehouse tree and has as its primary object the provision of a unique and highly desirable device of this class.

It is known to provide smokehouse trees which support the various types of meat, such as hams, which are to be cured by intimate contact with smoke in processes well known to the art. For many years, conventional racks, hangers, etc. have been used to support the product to be cured. The foregoing devices, however, have proved to be uneconomical because the neighboring hanging meat products have not been positioned adjacent each other as closely as possible without hindering circulation of the smoke. This may be traced to the fact that meat products are of tremendously varying sizes and shapes. Hence, ordinary racks and hangers are inadequate.

Still another problem encountered is that the smoke being circulated through the smokehouse contains wood distillate residue which condenses upon the smokehouse tree to foul ordinary releasable means such as the set screw in such a way as to "freeze" any moving parts.

It is, therefore, an object of the present invention to provide an adjustable smokehouse tree wherein vertical distance is variable to accommodate the varying sizes and shapes of meat products to be cured.

Still another object of the present invention is to provide an adjustable smokehouse tree which is easily removed from its support bracket and easily adjustable to a variety of heights without resort to skilled labor or complex tools.

Yet another object of the present invention is to provide an adjustable smokehouse tree which will not be fouled by component parts of smoke and which does not include moving parts.

A still further object of the present invention is to provide adjustable smokehouse trees which are adapted to nest when not in use and which are simple in construction and use and economical to produce.

The foregoing as well as other objectives of the invention are achieved by providing in combination a product supporting rack and a bracket therefor, the rack including perpendicular first and second arms, the first arm having spaced notches to aid in product suspension therefrom and the second arm having spaced hooked hanging means which releasably interfit in complementary apertures in the bracket to obtain the desired height of the spaced notches above ground.

Reference is now made to the appended drawing which depicts the various views of the present invention wherein:

FIG. 1 is a perspective view of a first embodiment of the present invention taken generally from the front thereof;

FIG. 2 is a fragmentary enlarged perspective view of the device of FIG. 1 taken generally from the rear thereof;

FIG. 3 is a sectional view taken along the lines 3—3 of FIG. 2;

FIG. 4 is a fragmentary perspective view of a second embodiment of the present invention; and FIG. 5 is a fragmentary perspective view of a third embodiment of the present invention.

Reference is now made to the various views of the drawing wherein reference characters refer to like parts throughout. A first embodiment of the present invention is generally shown at 10 in FIG. 1 and generally includes a product supporting rack 11 and a bracket 12 therefor.

Product supporting rack 11 comprises a first generally horizontal arm 13 and a second generally vertical arm 14 disposed at right angles to arm 13. Notches 15 are formed in the upper horizontal edge to assist in the fastening of the meat product to arm 13 as shown in FIG. 1. As indicated in FIG. 1, arms 13 and 14 are integral with each other although other forms are contemplated.

Secured to the rear surface of arm 14 as shown in FIGS. 2 and 3 are a plurality of hooked hanging means 16, two for each rack although in some cases one hook will suffice and in others more are needed. As indicated in FIG. 3, hooked means 16 each interfit into a complementary aperture 17 formed in bracket 12. As it is not necessary for the uppermost rack 18 to be adjustable, it is simply welded to bracket 12 as shown in FIG. 1. Bolted to the upper end of bracket 12 is link 19 to which is revolvably secured a wheel 20 which glides in track 21 for horizontal movement of the entire bracket 12.

In operation bracket 12 is moved horizontally, guided by track 21 until the desired position in the smoke room is achieved. Racks 11 then are adjusted to desired vertical positions along bracket 12 and are held in such a position by the releasable engagement of hooked means 16 in apertures 17. Even after large amounts of smoke distillate have condensed on the present device, the rack 11 thereof is simply and easily freed from bracket 12 by a simple upward blow of a hammer thereby avoiding the need for skilled workmen and complex tools.

A second embodiment of the present invention is generally shown in FIG. 4, and is generally similar to the device of FIGS. 1 to 3 except that bracket 12A includes two vertical sections 12a and 12b united by a bridging section 23, all of which may be of channel section as there shown. Link 19, wheel 20 and track 21 are as before.

A third embodiment of the present invention is generally shown in FIG. 5 and is in some respects similar to the device of FIG. 4 in having vertical sections 28 and 29 united by bridging section 23 with link 19, wheel 20 and track 21. Rack 11, however includes transverse horizontal wings 24 and 25 which merge into longitudinal horizontal arms 26, 27 in which notches 15 are formed. Support arms 26, 27 are formed at right angles to and as an integral part of wings 24, 25. Formed in the outer surface of wings 24, 25 are hooked hanging means 30 which interfit in apertures 17 of vertical sections 28 and 29. As shown in FIG. 5 uppermost rack 31 has one transverse wing 33 affixed to section 28 and bridging section 23 by angle piece 32. Wing 33 is welded to section 28 as adjustability of upper rack 31 is unnecessary. Opposing transverse wing 34 is affixed to bridging section 23 in a well known manner as by an angle piece 35. However, wing 34 is not welded to vertical section 29.

Vertical section 29 is pivotally secured to bridging section 23 via hinge 36 so that the product supporting racks may be released from apertures 17 as previously discussed. Section 29 is simply pivoted in the direction of arrow 22 as shown in FIG. 5 to facilitate vertical adjustment of racks.

It is thus seen that a simple and effective solution to long standing problems is provided by the present invention.

It is to be understood that the foregoing embodiments have been presented as exemplary of the present invention and should not in any way constitute a limitation thereof but are merely a detailed description. The present invention is of broad scope and is limited only by the appended claim.

What is claimed as the invention is:

A vertically adjustable, horizontally movable smokehouse tree comprising in combination a vertically adjustable product supporting rack and at least one horizontally movably mounted, vertically extending bracket therefor, said rack comprising a horizontal supporting arm, and a vertical supporting arm perpendicular thereto, thereby assuming the configuration of an inverted T, said horizontal rack arm including a plurality of spaced notches each adapted to support a product suspended therefrom, said rack including on one surface thereof hooked hanging means, said bracket comprising at least one elongated body member having vertically spaced apertures formed therein, said bracket and said vertical rack arm being in surface contact, said bracket having a wheel extending therefrom for rolling movement in a horizontal track, whereby said product supporting rack is adapted to releasably interfit at vertical intervals within at least one of said bracket apertures to obtain the desired height thereof above ground, and whereby said rack is also horizontally adjustable as said wheel is moved in said horizontal track.

References Cited in the file of this patent

UNITED STATES PATENTS

| | | |
|---|---|---|
| 694,766 | MacMillan | Mar. 4, 1902 |
| 2,127,280 | Zimbalist | Aug. 16, 1938 |
| 2,643,777 | Pickens | June 30, 1953 |
| 2,783,961 | Weber | Mar. 5, 1957 |
| 2,956,766 | Galassi | Oct. 18, 1960 |
| 2,957,672 | Logan | Oct. 25, 1960 |
| 3,011,650 | Engelhorn | Dec. 5, 1961 |
| 3,029,952 | Bagdon | Apr. 17, 1962 |